United States Patent [19]

Lauf et al.

[11] Patent Number: 5,721,286
[45] Date of Patent: Feb. 24, 1998

[54] METHOD FOR CURING POLYMERS USING VARIABLE-FREQUENCY MICROWAVE HEATING

[75] Inventors: Robert J. Lauf, Oak Ridge; Don W. Bible, Clinton; Felix L. Paulauskas, Oak Ridge, all of Tenn.

[73] Assignee: Lockheed Martin Energy Systems, Inc., Oak Ridge, Tenn.

[21] Appl. No.: 523,902

[22] Filed: Sep. 6, 1995

Related U.S. Application Data

[63] Continuation of Ser. No. 221,188, Mar. 31, 1994, abandoned, which is a continuation-in-part of Ser. No. 792,103, Nov. 14, 1991, Pat. No. 5,321,222.

[51] Int. Cl.$^6$ ............................... C08J 3/28; C08J 5/08; C08J 5/24

[52] U.S. Cl. ............................... 522/1; 522/3; 522/71; 522/81; 522/83; 522/84; 522/170; 522/172; 522/173; 522/174; 522/184; 528/10; 528/44; 528/86; 528/373; 528/403; 528/421; 528/422

[58] Field of Search ............................... 427/508, 514, 427/516, 521; 522/1, 3, 4, 5, 71, 81, 83, 84, 170, 172, 173, 174, 184; 528/10, 44, 86, 373, 403, 421, 422

[56] References Cited

U.S. PATENT DOCUMENTS

| | | | |
|---|---|---|---|
| 3,611,135 | 10/1971 | Margerum | 324/85 |
| 3,619,252 | 11/1971 | Roscher | 117/66 |
| 4,144,468 | 3/1979 | Mourier | 310/72 |
| 4,196,332 | 4/1980 | MacKay et al. | 219/10.55 B |
| 4,340,796 | 7/1982 | Yamaguchi et al. | 219/10.55 |
| 4,415,789 | 11/1983 | Nobue et al. | 219/10.55 |
| 4,504,718 | 3/1985 | Okatsuka et al. | 219/10.55 |
| 4,593,167 | 6/1986 | Nilssen | 219/10.55 |
| 4,777,336 | 10/1988 | Asmussen | 219/10.55 M |
| 4,825,028 | 4/1989 | Smith | 219/10.55 |
| 4,843,202 | 6/1989 | Smith | 219/10.55 |
| 4,866,344 | 9/1989 | Rose et al. | 315/3.5 |
| 4,939,331 | 7/1990 | Berggren et al. | 219/10.55 |
| 5,241,040 | 8/1993 | Cuomo et al. | 528/353 |
| 5,296,271 | 3/1994 | Swirbel et al. | 427/493 |
| 5,317,081 | 5/1994 | Gelorme et al. | 528/353 |
| 5,321,222 | 6/1994 | Bible et al. | 219/745 |

OTHER PUBLICATIONS

MacKay, B, A., et al., "Frequency Agile Sources for Microwave Ovens", *Journal of Microwave Power*, vol. 14(1), 1979, pp. 63–76.

Swain, B., "Microwave Sintering of Ceramics", *Advanced Materials & Processes Incorporating Metal Progress*, Sep., 1988, reprinted.

Gewartowski, J.W., "Traveling–Wave Tube", *McGraw–Hill Encyclopedia of Science and Technology*, vol. 18, 16th Edition, 1987, pp. 509–511.

El-Sayed, E.M., et al., "Use of Sheath Helix Slow–Wave Structure as an Applicator in Microwave Heating Systems", *Journal of Microwave Power*, 16(3&4), 1981, pp. 283–288.

Lewis, D.A., et al., "Accelerated Imidization Reactions Using Microwave Radiation", *J. Polymer Sci.*: Part A: Polymer Chem., vol. 30, 1992, pp. 1647–1653.

Lauf, R.J., et al., *Polymer Curing in a Variable Frequency Microwave Oven*, 28th Microwave Power Symposium, Montreal, Canada, Jul. 12–14, 1993.

Primary Examiner—Susan W. Berman
Attorney, Agent, or Firm—Jeffrey N. Cutler

[57] ABSTRACT

A method for curing polymers (11) incorporating a variable frequency microwave furnace system (10) designed to allow modulation of the frequency of the microwaves introduced into a furnace cavity (34). By varying the frequency of the microwave signal, non-uniformities within the cavity (34) are minimized, thereby achieving a more uniform cure throughout the workpiece (36). A directional coupler (24) is provided for detecting the direction of a signal and further directing the signal depending on the detected direction. A first power meter (30) is provided for measuring the power delivered to the microwave furnace (32). A second power meter (26) detects the magnitude of reflected power. The furnace cavity (34) may be adapted to be used to cure materials defining a continuous sheet or which require compressive forces during curing.

13 Claims, 8 Drawing Sheets

METHOD FOR CURING POLYMERS USING VARIABLE-FREQUENCY MICROWAVE HEATING

This is a continuation of application Ser. No. 08/221,188 filed on Mar. 31, 1994, now abandoned, which in turn, is a C-I-P of 07/792,103, filed Nov. 14, 1991, now U.S. Pat. No. 5,321,222.

This invention was made with Government support under Contract No. DE-AC05-84OR21400 awarded by the U.S. Department of Energy to Martin Marietta Energy Systems, Inc. and the Government has certain rights in this invention.

This application in part discloses and claims subject matter disclosed in an earlier filed pending application, Ser. No. 07/792,103 filed on Nov. 14, 1991, which issued into U.S. Pat. No. 5,321,222 on Jun. 14, 1994, which disclosed subject matter invented by at least one inventor of the present invention.

TECHNICAL FIELD

This invention relates to the field of microwave radiation. More specifically, this invention relates to the microwave-assisted curing of polymer materials by selectively varying the frequency and power of the microwave source.

BACKGROUND ART

It is well known that advanced polymer matrix composites have a combination of physical attributes that make them potentially attractive for many applications, particularly where high specific strength and stiffness are needed. However, one barrier to their widespread use is the long cycle time typically required to cure and consolidate a finished component. Composites are often hand-assembled as a layup of prepreg tape, vacuum bagged, then cured in an autoclave under heat and pressure for times of 2 to 12 hours.

The significant reduction of processing cycle times is necessary for the use of such composites in a much broader range of applications. Microwave heating can speed processing due to the volumetric deposition of microwave energy being more efficient than conduction from the surface. Furthermore, microwave heating enhances polymerization kinetics in some systems, as discussed by D. A. Lewis, et al., "Accelerated Imidization Reactions Using Microwave Radiation," *J. Polymer Sci.: Part A: Polymer Chem.*, Vol 30, 1647–1653 (1992).

In the field of microwave heating, it is well known that microwave furnaces are typically constructed with a fixed operating frequency. Microwave ovens constructed for home use are provided with a magnetron which operates at 2.45 GigaHertz (GHz), which is an efficient frequency for heating water. Due to the coupling ability of a 2.45 GHz microwave energy to water, these ovens are used for cooking foods, drying, and other purposes wherein the principal material to be acted upon is water. However, it is well known that frequencies in this range are not suitable in all situations.

It is known that fixed-frequency microwave ovens typically found have cold spots and hot spots. Such phenomena are attributed to the ratio of the wavelength to the size of the microwave cavity. With a relatively low-frequency microwave introduced into a small cavity, standing waves occur and thus the microwave power does not uniformly fill all of the space within the cavity, and the unaffected regions are not heated. In the extreme case, the oven cavity becomes practically a "single-mode" cavity.

Attempts have been made at mode stirring, or randomly deflecting the microwave "beam", in order to break up the standing waves and thereby fill the cavity with the microwave radiation. One such attempt is the addition of rotating fan blades at the beam entrance of the cavity. This approach is limited by two factors, namely, the size of the mechanical perturbation and the speed at which the fan blades can be rotated. It will be appreciated that non-uniformities in the microwave power within the oven cavity will inevitably produce non-uniform curing. In some polymers, their low thermal conductivity and exothermic cure can lead to catastrophic thermal runaway under conventional microwave heating in a multi-mode cavity.

Another method used to overcome the adverse effects of standing waves is to intentionally create a standing wave within a single-mode cavity such that the workpiece may be placed at the location determined to have the highest power (the hot spot). Thus, only the portion of the cavity in which the standing wave is most concentrated will be used. This poses a serious limitation insofar as only a small volume of material can be processed at one time.

The use of frequency sweeping over a wide range as a means of mode stirring was disclosed in the above-referenced co-pending application Ser. No. 07/792,103, now U.S. Pat. No. 5,321,222. Electronic frequency sweeping may be performed at a high rate of speed, thereby creating a much more uniform time-averaged power density throughout the furnace cavity. The desired frequency sweeping may be accomplished through the use of a variety of microwave electron devices. A helix traveling wave tube, or TWT, for example, allows the sweeping to cover a broad bandwidth (e.g., 2 to 8 GHz) compared to devices such as the voltage tunable magnetron (2.45+−0.05 GHz). Other devices have other characteristic bandwidths as will be discussed.

Other devices have been produced to change the parameters of the heating process of selected materials, thus to optimize the efficiency of the heating process of selected materials. Typical of the art are those devices disclosed in the following U.S. patents:

| U.S. Pat. No. | Inventor(s) | Issue Date |
| --- | --- | --- |
| 3,611,135 | D. L. Margerum | Oct 5, 1971 |
| 4,144,468 | G. Mourier | Mar 13, 1979 |
| 4,196,332 | A. MacKay B, et al. | Apr 1, 1980 |
| 4,340,796 | M. Yamaguchi., et al. | Jul 20, 1982 |
| 4,415,789 | T. Nobue, et al. | Nov 15, 1983 |
| 4,504,718 | H. Okatsuka, et al. | Mar 12, 1985 |
| 4,593,167 | O. K. Nilssen | Jun 3, 1986 |
| 4,777,336 | J. Asmussen | Oct 11, 1988 |
| 4,825,028 | P. H. Smith | Apr 25, 1989 |
| 4,843,202 | P. H. Smith, et al. | Jun 27, 1989 |
| 4,866,344 | R. I. Ross, et al. | Sep 12, 1989 |
| 4,939,331 | B. Berggren, et al. | Jul 3, 1990 |

The subject matter disclosed by MacKay ('332) is further discussed in an article authored by MacKay B, et al., entitled "Frequency Agile Sources for Microwave Ovens", *Journal of Microwave Power*, 14(1), 1979. However, a microwave furnace having a wide frequency range has not been disclosed, except in the above-referenced U.S. Pat. No. 5,321,222. The use of a variable frequency microwave oven to cure thermosetting polymers has not been reported except by the inventors of the present invention in "Polymer Curing in a Variable Frequency Microwave Oven," 28th Microwave Power Symposium, Montreal, Canada, Jul. 12–14, 1993.

Therefore, it is an object of this invention to provide a method for curing polymers using microwave heating.

Another object of the present invention is provide such a method whereby the curing time of thermosetting polymers is reduced.

A further object of the present invention is to provide a method whereby more uniform curing throughout a polymer article may be achieved.

Yet another object of the present invention is to provide a method of curing polymers wherein thermal runaway is substantially prevented.

Still another object of the present invention is to provide a microwave curing method for polymers whereby frequency modulation may be used as a form of mode stirring to create a more uniform power distribution in a multi-mode cavity and the polymer placed therein.

DISCLOSURE OF THE INVENTION

Other objects and advantages will be accomplished by the present invention which is designed to allow modulation of the frequency of the microwaves introduced into a multi-mode cavity to create a highly-uniform time-averaged power density throughout the volume of the cavity.

In the preferred embodiment, a polymer article to be cured is placed within a multi-mode microwave applicator cavity and exposed to microwaves of varying frequency, whereby the polymer article is uniformly heated to effect a desired reaction such as curing, cross-linking, drying, or vulcanization.

In another preferred embodiment, a multi-mode applicator cavity is constructed with openings at each end to accommodate the passage of a continuous polymer article such as a film, sheet, web, or extrusion. As in the first preferred embodiment, the polymer is continuously exposed to microwaves of varying frequency as it passes through the applicator cavity.

In yet another preferred embodiment, the polymer contains reinforcing fibers disposed within itself in a continuous or semi-continuous pattern. The applicator cavity further contains a compressor for applying a compressive load to keep the individual layers of reinforcing fibers from separating as the polymer flows during the early stages of curing.

In each of the above embodiments, a microwave signal generator is provided for generating a low-power microwave signal for input to the microwave amplifier. The signal generator of the preferred embodiment is able to sweep a given range of frequencies, operate in pulse mode, modulate the frequency of the microwave signal, and produce various complex waveforms. The microwave signal generator of the preferred embodiment may be operated in the pulse mode using an internal pulse generator or it can be pulsed externally. An internal modulator is provided for wide band modulation. The internal modulator may operate in the AM mode or in the FM mode.

A voltage controller serves to modulate the amplitude of the microwave voltage-controlled oscillator. The microwave voltage-controlled oscillator may be used in lieu of the microwave signal generator to modify the frequency and amplitude of the generated microwave.

A first amplifier may be provided to amplify the magnitude of the signal output from the microwave signal generator or the microwave voltage-controlled oscillator. The first amplifier of the preferred embodiment is voltage-controlled, therefore the gain is adjustable such that the magnitude of the output is selectable by the operator.

A second amplifier is provided for processing the signal output by the first amplifier, or from the microwave signal generator or the microwave voltage-controlled oscillator when a first amplifier is not employed. The second amplifier outputs a high-power microwave signal to the furnace cavity and to which the workpiece is subjected. In the preferred embodiments, the second amplifier may be any one of a helix traveling-wave tube (TWT), a coupled-cavity TWT, a ring-loop TWT, a ring-bar TWT, a klystron, a twystron, or a gyrotron. These devices include an internal cooling device designed to dissipate the heat collected by the amplifier during normal operation.

In another embodiment of the invention, the oscillator and first and second amplifiers may be replaced with a frequency-agile coaxial magnetron, the frequency of which can be tuned manually, mechanically, or electrically.

A power supply is provided for the operation of the second amplifier. In the preferred embodiments, the power supply is a direct current source consisting of a precision-regulated cathode power supply and a less-regulated collector high voltage supply.

A directional coupler is provided for detecting the direction of a signal and further directing the signal depending on the detected direction. A signal received from the microwave source is directed toward the microwave cavity. A signal received from the direction of the microwave cavity is directed toward a reflected power load. The directional coupler thus provides a means whereby reflected power is diverted away from the microwave source in order to protect the microwave source from power unabsorbed by the workpiece. The directional coupler of the preferred embodiment is water-cooled for the dissipation of heat collected through the transmission of power from the microwave source and the reflection of power from the microwave cavity.

A first power meter is provided for measuring the power delivered to the microwave cavity. The first power meter is used in conjunction with a second power meter positioned to measure reflected power from the microwave cavity in order to monitor the efficiency of the microwave cavity and to insure that reflected power is dissipated in the reflected power load and not by the second amplifier.

The reflected power load may also be used to test the functionality of the system by removing all workpieces from the microwave cavity, thus directing the entire signal from the second amplifier into the reflected power load. Comparisons can be made of the power received by the reflected power load and the power delivered from the second amplifier to determine any system losses.

The magnitude of the reflected power is detected by the second power meter. This magnitude may be used to determine the efficiency of the instant frequency of the microwave introduced into the microwave cavity. A lower reflected power will indicate a more efficient operating frequency due to the higher absorption rate of the selected workpiece.

A tapered transition may be provided to enhance the efficiency with which the broadband microwave energy is coupled into the microwave cavity. By acting as an impedance transformer between the transmission line and the microwave cavity, this transition increases the percentage power coupled into the cavity. In addition, for applications in which the microwave energy must be coupled into a cavity in which reactive gases are present, this tapered transition provides a means of reducing the power density of the microwave energy at the interface between the window and reactive gases, thereby preventing formation of plasma discharges at the input window.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

The method 11 of curing polymers of the present invention is performed using a variable frequency microwave heating apparatus such as that illustrated generally at 10 in the figures. The microwave heating apparatus 10 is designed to allow modulation of the frequency of the microwaves introduced into a microwave cavity 34 for testing or other selected applications. Such modulation is useful in testing procedures to determine the most efficient frequencies at which a particular material may be processed. Frequency modulation is also useful as a method of mode stirring as a means to create a more uniform power distribution in a relatively small furnace cavity.

Frequency modulation testing is useful, not only in the determination of efficient sintering frequencies of a selected material, but also in determining the most efficient sintering frequencies for the individual phases of a selected material. In the same vein, frequency modulation is useful in the processing of a material undergoing phase changes, wherein each phase of the material couples more efficiently to a frequency varied from that of other phases. Further, frequency modulation is useful when processing composite materials wherein each component couples to a different frequency than other components.

Figure 1:
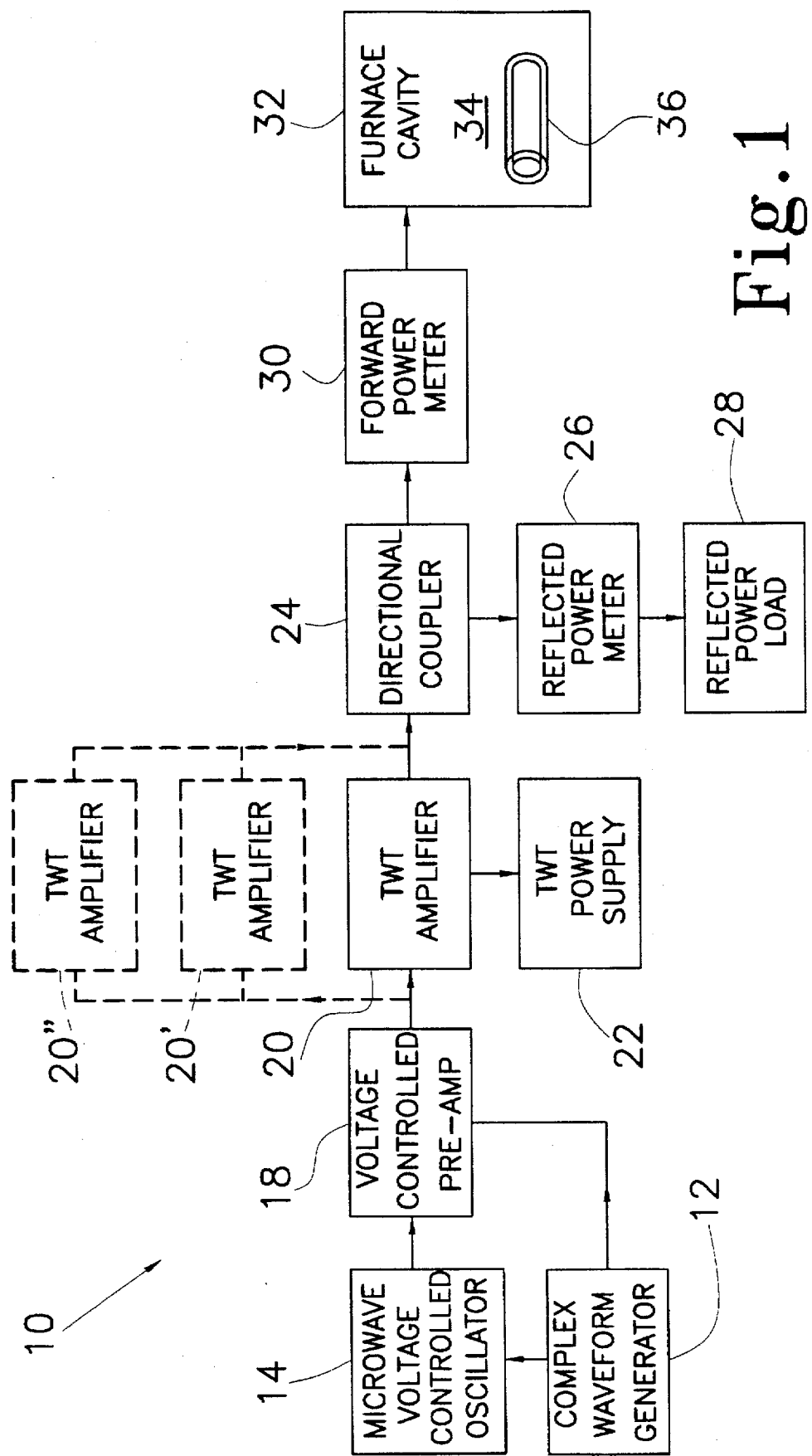
FIG. 1 is a schematic diagram of the preferred embodiment of the variable frequency microwave heating apparatus of the present invention.

FIG. 1 illustrates schematically the preferred embodiment of the variable frequency microwave heating apparatus 10 used in conjunction with the method 10 of the present invention, wherein a selected workpiece 36 is to be processed. Applicable processes include, but are not limited to, heat treatment, sterilization, sintering, plasma processing, ore processing, polymerization, etching, and preparing films. It will be understood that the term "workpiece" as used within the present disclosure refers to a selected material or composition of materials. The term "workpiece" may further include such selected material or composition of materials wherein at least one of the materials is undergoing at least one phase change and is, therefore, in more than one phase at a given time.

A microwave voltage-controlled oscillator 14 is provided for generating a low-power microwave signal for input to the microwave furnace 32. A complex waveform generator 12 provides the controlling voltage to the voltage-controlled oscillator 14, causing the voltage-controlled oscillator to sweep a given range of frequencies, operate in pulse mode, modulate the frequency of the microwave signal, and produce various complex waveforms.

The complex waveform generator 12 of the preferred embodiment may be operated in the pulse mode using an internal pulse generator or it can be pulsed externally. An internal modulator is provided for wide band modulation. The internal modulator may operate in the AM mode or in the FM mode.

The microwave voltage controlled oscillator 14 generates a microwave signal of a frequency determined by the voltage applied to the voltage controlled oscillator 14 by the waveform generator 12. It may be desirable to modulate the frequency of the microwave as a selected material may efficiently couple with a particular frequency and require a high voltage level, whereas a second material may couple more efficiently at a different frequency and at a lower, or higher, voltage level. Thus, the microwave voltage-controlled oscillator 14 may be used in combination with the complex waveform generator 12 to modify the frequency of the generated microwave.

It will be seen that the number of possible combinations of frequencies and power levels is numerous. Further, with the ability of such frequency and amplitude modulation, it will be seen that the processing of a workpiece 36 may be accomplished by alternating the frequency and amplitude of the microwave in order to achieve maximum processing efficiency. The modulations may occur at such rates as to be undetectable by the workpiece 36, yet creating maximum processing efficiency for each material and material phase.

A first amplifier 18 may be provided to amplify the power of the signal output from the microwave voltage-controlled oscillator 14. The first amplifier 18 of the preferred embodiment is voltage-controlled, therefore the gain is adjustable such that the magnitude of the output is selectable by the operator. During operation of the variable frequency microwave heating apparatus 10, the operator may instantaneously adjust the first amplifier 18 such that the amplitude of the microwave may be correspondingly adjusted. The control voltage for the first amplifier 18 can also be supplied by the complex waveform generator 12, allowing the amplitude of the signal output to be modulated in any desired way.

A second amplifier 20 is provided for processing the signal output by the first amplifier 18, or from the microwave voltage-controlled oscillator 14 when a first amplifier 18 is not employed. The second amplifier 20 outputs the microwave signal input to the multi-mode furnace cavity 34 and to which the workpiece 36 is subjected. In the preferred embodiments, the second amplifier 20 may be any one of a helix traveling-wave tube (TWT), a coupled-cavity TWT, a ring-loop TWT, a ring-bar TWT, a klystron, a twystron, or a gyrotron.

The TWT 20 is a linear beam device wherein a signal having a selected frequency and wave form is amplified and output. The TWT 20 has the capability of amplifying any selected frequency or waveform within a range or bandwidth defined by the configuration of the TWT 20. Particularly, the physical geometry of the TWT 20 limits the frequency range, such that as a high limit is reached, a counteracting signal is encountered, giving the appearance of a second wave.

In order to achieve a frequency higher or lower than that capable of the TWT 20 incorporated in a particular configuration, the internal geometry of the TWT 20, especially the pitch of the helix 40, is changed. In the latter mentioned TWT 20, a new frequency range will be defined. It will be seen, therefore, that a variety of configurations of TWT's 20 is possible such that a broader range of frequencies may be achieved. To this end, the TWT's 20 of the present invention are designed to be selectively removable from the variable frequency microwave heating apparatus 10 and interchangeable with other such TWT's 20. Hence, a single microwave voltage-controlled oscillator 14, microwave furnace 32, and microwave furnace cavity 34 may be used with a variety of TWT's 20, thus allowing a series of identical tests to be performed with the microwave frequency being substantially the only variable. One TWT 20 may define a frequency range of 4 GHz to 8 GHz, while another TWT 20' defines a frequency range of 8 GHz to 16 GHz. Still another TWT 20" may define a third frequency range. Interchanging TWT 20 with TWT 20' defines a total range from 4 GHz to 16 GHz. One such TWT 20 defining a range of 4 GHz to 8 GHz is the Model T-1096 G/H Band Helix TWT manufactured by Microwave Laboratories, Inc. Specifications for the Model T-1096 are listed in Table 1.

Figure 3:
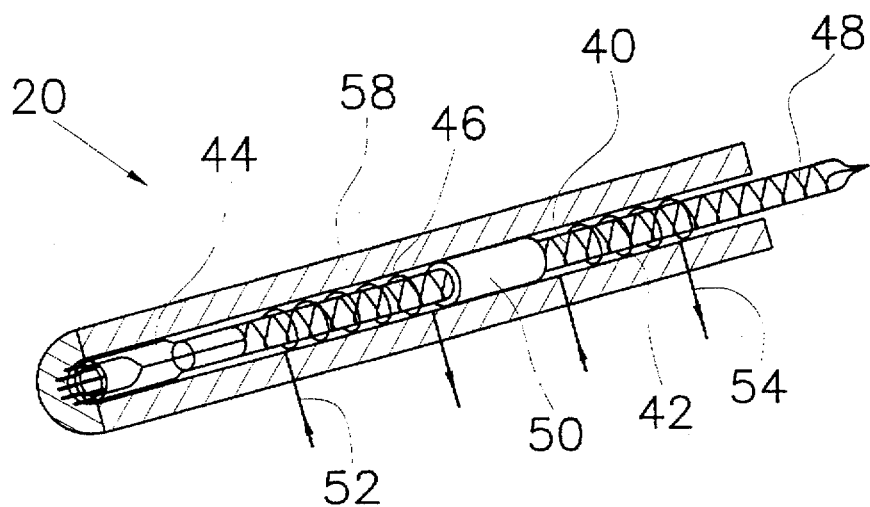
FIG. 3 is a perspective view of the traveling wave tube, shown partially in section, which is incorporated in the variable frequency microwave heating apparatus of the present invention.
Figure 4:
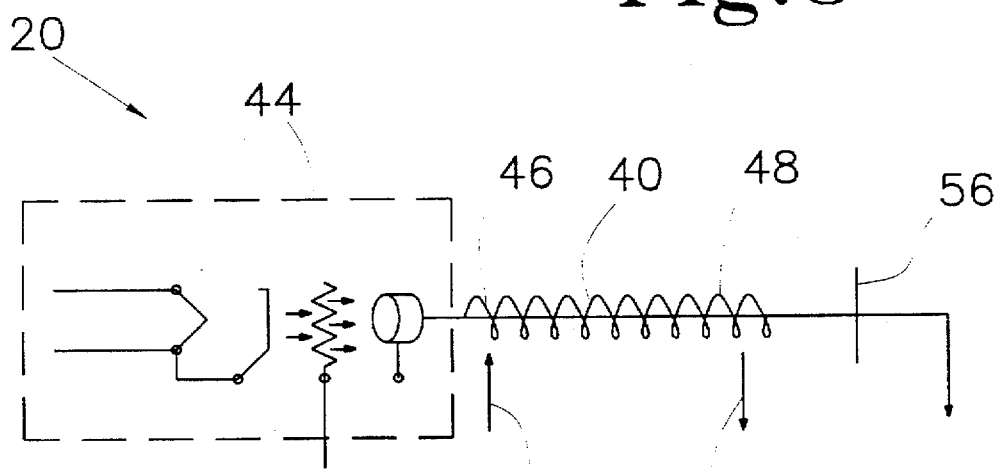
FIG. 4 is a schematic diagram of a traveling wave tube which is incorporated in the variable frequency microwave heating apparatus of the present invention.
Figure 5:
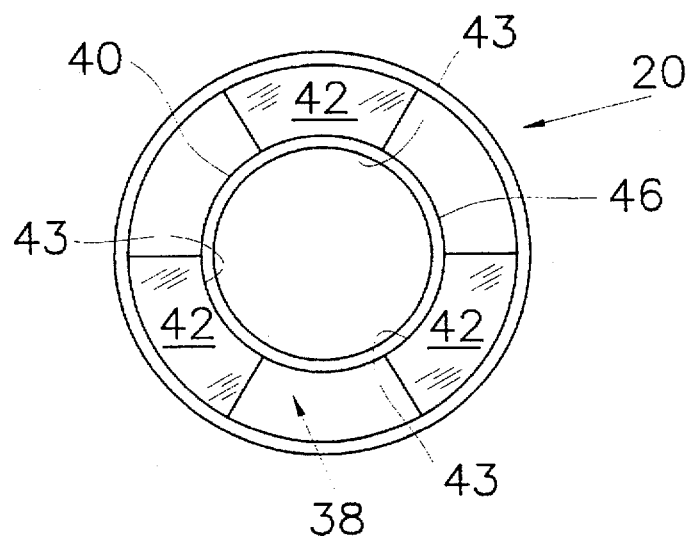
FIG. 5 is an end view of the traveling wave tube, shown in cross-section, which is incorporated in the variable frequency microwave heating apparatus of the present invention.

As earlier mentioned, the traveling wave tube 20 is a linear beam device characterized by a traveling electric field which continuously extracts energy longitudinally along the path of an electron beam. As shown graphically in FIG. 3 and diagrammatically in FIG. 4, a typical TWT 20 is constructed with an electron gun assembly 44 attached to the first end 46 of a single-wire helix 40. The gun assembly 44 produces a focused beam of electrons which is directed through the center of the helix 40. Tapered carbon attenuators 50, integral to the helix 40, serve as directional couplers preventing reflections from passing back to the tube input. Rf input and output windings 52,54 are placed at the cathode and collector ends 46,48, respectively, of the helix 40.

A collector 56, charged positively, is located at the second end 48 of the helix 40. The collector 56 provides the source of energy for the operation of the TWT 20. Beam focusing and containment magnets 58 surround the entire

TABLE 1

| Specifications for the T-1096 G/H Band Helix TWT | | | | |
|---|---|---|---|---|
| | Min | Max | Typ | Unit |
| RF Performance | | | | |
| Power Output | 63.0 | 65.0 | 63.5 | dbm |
| Frequency Range | 4.0 | 8.0 | | Ghz |
| Harmonic Content | — | −3.0 | −6.0 | dbc |
| Gain at rated Power | 25.0 | 37.0 | 30.0 | db |
| Electrical Parameters | | | | |
| Helix Voltage | −8.0 | −9.0 | −8.4 | kV |
| Anode Voltage (WRTC) | 0.0 | +9.0 | — | kV |
| Collector Voltage (WRTC) | +6.2 | +6.8 | +6.5 | kV |
| Filament Voltage (WRTC) | 12.4 | 13.2 | 12.8 | V |
| Solenoid Voltage | 35.0 | 57.0 | 48.0 | V |
| Vac-Ion Voltage | +3.5 | +5.0 | +3.5 | kV |
| Helix Current | — | 25.0 | 15.0 | mA |
| Anode Current | — | 5.0 | — | mA |
| Collector Current | 0.9 | 1.8 | 1.2 | A |
| Filament Current | 1.2 | 2.0 | 1.4 | A |
| Solenoid Current | 21.0 | 26.0 | 25.0 | A |
| Vac-Ion Current | — | 0.01 | — | mA |
| Prime Power | | 10.7 | 9.2 | kW | assembly of the TWT 20.

Electrons traversing the axis of the helix 40 interact with the rf wave propagating along the helix 40 such that energy is transferred from the electron beam to the rf wave. This interaction is continuous and cumulative, increasing the amplitude of the rf signal as it propagates along the helix 40.

The second amplifier 20 of the preferred embodiment includes an internal cooling device 38 designed to dissipate the heat collected by the second amplifier 20 during normal operation. Particularly, in the event of a helix TWT, the helix of the TWT 20 and the helix supports 42 are fabricated from selected materials in order to perform this function. The helix TWT 20 of the preferred embodiment is provided with a helix 40 fabricated from flat copper wire. A plurality of retainers 42 are positioned in parallel fashion about the longitudinal axis of the helix TWT 20 about which the copper wire is wrapped, the retainers 42 serving to retain the helix 40 defined by the copper wire and further to dissipate the heat transferred to the copper wire during operation of the helix TWT 20. In the preferred embodiment the retainers 42 define a cross-section with at least one substantially flat side 43, the flat side 43 being in substantial contact with the copper wire.

Further, the retainers 42 of the preferred embodiment are fabricated from beryllium oxide. It is known that even though beryllium oxide is an electrical insulator, it is also an excellent conductor of heat. The copper wire defining a flat cross-section and substantially contacting the flat side 43 of the retainers 42 provides for an efficient and thorough dissipation of the heat transferred to the copper wire, thus providing a cooling means 38 for the internal portion of the helix TWT 20 and hence extending the life of the helix TWT A power supply 22 is provided for the operation of the second amplifier 20. Though not individually depicted in the figures, the preferred power supply 22 is a direct current source consisting of a precision-regulated cathode power supply and a less-regulated collector high voltage supply. Output regulation for the cathode supply is accomplished through a tube regulator circuit using a tetrode tube. One such tube is the Eimac 4PR400A tube. Regulation for the collector supply and the cathode raw supply is accomplished with an electromechanical regulator. The collector supply of the preferred embodiment is provided with two switch plates for the selection of output ranges. A typical power supply 22 used to power the second amplifier 20 is the Universal Voltronics Model BRE-15-140-ML High Voltage Power Supply. The specifications of the Universal Voltronics power supply are listed in Table 2.

Figure 2:
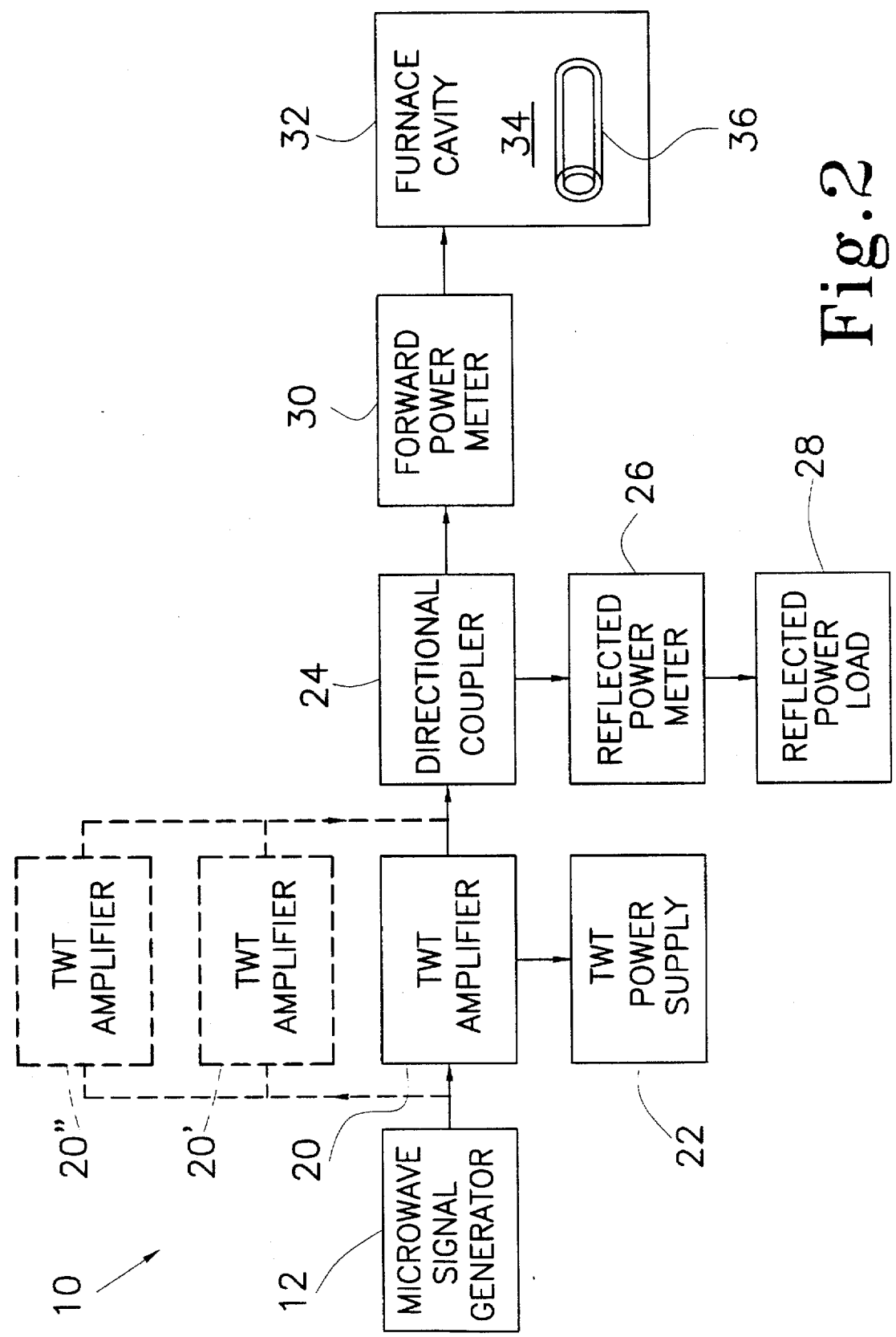
FIG. 2 illustrates a schematic diagram of another preferred embodiment of the variable frequency microwave heating apparatus of the present invention.

As shown in FIG. 2, the variable frequency microwave heating apparatus 10 may be operated without the use of a microwave voltage-controlled oscillator means 14 and a first amplifier 18. In this embodiment, the microwave signal generator 12 is employed independently to generate a selected signal and is output directly without further modification. One such microwave signal

TABLE 2

Electrical Specifications for the Universal
Voltronics Model BRE-15-140-ML Power Supply

HELIX SUPPLY

| | |
|---|---|
| Output Voltage | 500V–15KVDC |
| Output Current | 140 mADC |
| Polarity | Negative Output |
| Ripple | .01% rms @ 15KVDC, 140mADC |
| Regulation, load | +0.1% from no load to full load @ maximum output |
| Regulation, line | +0.1% for line voltage from 190–230 VAC @ maximum output |

COLLECTOR SUPPLY

| | |
|---|---|
| Output Voltage and Current Mode I (parallel) | 0–5KV @ 4000mA |
| Mode II (series) | 0–10KV @ 2000mA |
| Polarity | Positive output, negative tied to helix supply |
| Ripple | 3% rms @ 10KVDC, 2000mA |
| Regulation, load | +2% from no load to full load @ maximum output |
| Regulation, line | +2% for line voltage from 190–230 VAC @ maximum output |

CROWBAR (connected across the collector supply)

| | |
|---|---|
| Response Time | 5 microseconds |

SYSTEM

| | |
|---|---|
| Input Voltage | 190–230 VAC phase to phase, 3 phase, 60Hz, 30KVA |
| Power Connection | 5 position terminal board (3 phase neutral ground) |
| Output Connectors | 10-32 studs for collector, cathode & helix |
| Controls Connector | 90 pin Elco connector | generator 12 is the Model 6724 signal generator manufactured by Wiltron. In this embodiment, the amplitude modulation is performed within the power supply 22 of the second amplifier 20.

Referring to FIGS. 1 and 2, a directional coupler 24 is provided for detecting the direction of a signal and further directing the signal depending on the detected direction. The directional coupler 24 is provided proximate the collector end of the second amplifier 20. A signal received from the second amplifier 20 is directed toward the microwave cavity 32. A signal received from the direction of the microwave cavity 32 is directed toward a reflected power load 28. The directional coupler 24 thus provides a means whereby a reflected signal—that is, power not absorbed by the workpiece 36 and therefore directed back toward the source 20—is diverted away from the second amplifier 20 in order to protect the second amplifier 20 from power unabsorbed by the workpiece 36. The reflected power load 28 of the preferred embodiment is water-cooled for the dissipation of heat collected through the reflection of power from the microwave cavity 32.

A first power meter 30 is provided for measuring the power delivered to the microwave cavity 32. The first power meter 30 is used in conjunction with a second power meter 26 positioned to measure reflected power from the microwave cavity 32 in order to monitor the efficiency of the microwave cavity 32 and to insure that reflected power is dissipated in the reflected power load 28 and not by the second amplifier 20.

The signal output by the second amplifier 20 is introduced into the microwave cavity 34 for absorption by the selected workpiece 36. Typically, the introduced signal is not completely absorbed by the workpiece 36 and is therefore reflected back toward the second amplifier 20, having no other path to follow.

The reflected signal reaches the directional coupler 24 and is there diverted toward the second power meter 26 and finally to the reflected power load 28. The reflected power is dissipated in the reflected power load 28, as previously mentioned, in an attempt to protect the longevity of the second amplifier 20. The reflected power load 28 may also be used to test the functionality of the system by removing all workpieces 36 from the microwave cavity 34, thus directing the entire load from the second amplifier 20 into the reflected power load 28. Comparisons can be made of the power received by the reflected power load 28 and the power delivered from the second amplifier 20 to determine any system losses.

The magnitude of the reflected power is detected by the second power meter 26. This magnitude may be used to determine the efficiency of the instant frequency of the microwave introduced into the microwave cavity 34. A lower reflected power will indicate a more efficient operating frequency due to the higher absorption rate of the selected workpiece 36.

Figure 6:
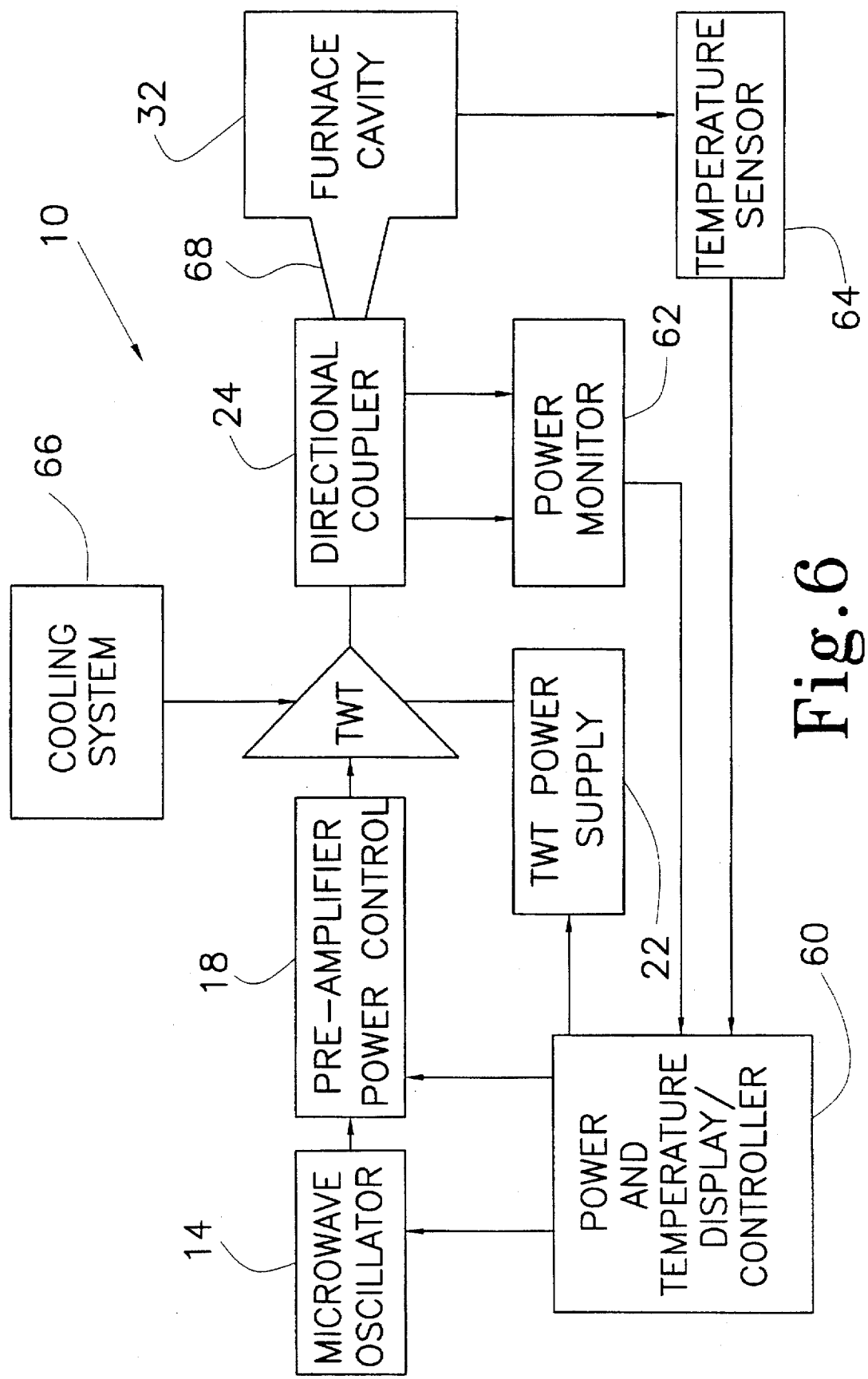
FIG. 6 illustrates a schematic diagram of another preferred embodiment of the variable frequency microwave heating apparatus of the present invention.

Illustrated in FIG. 6 is an alternate embodiment of the variable frequency microwave heating apparatus 10. In this embodiment, a power and temperature display and controller 60 receives input from a power monitor 62 and a temperature sensor 64. The power monitor 62 receives input from the directional coupler 24 and serves the same basic functions as the reflected and forward power meters 26,30 incorporated in the previously described embodiment. The power and temperature display and controller 60 further serves to control the microwave oscillator 14, the pre-amplifier power control 18, and the TWT power supply 22. A cooling system 66 is provided for cooling at least the TWT 20 during operation thereof.

A tapered waveguide coupler 68 may be provided to enhance the efficiency with which the broadband microwave energy is coupled into the microwave cavity. By acting as an impedance transformer between the transmission line from the directional coupler 24 and the microwave cavity 32, this transition increases the percentage power coupled into the microwave cavity 32. In addition, for applications in which the microwave energy must be coupled into a microwave cavity 32 in which reactive gases are present, the tapered waveguide 68 provides a means of reducing the power density of the microwave energy at the interface between the microwave input window and reactive gases, thus preventing the formation of plasma discharges at the microwave input window.

Figure 7:
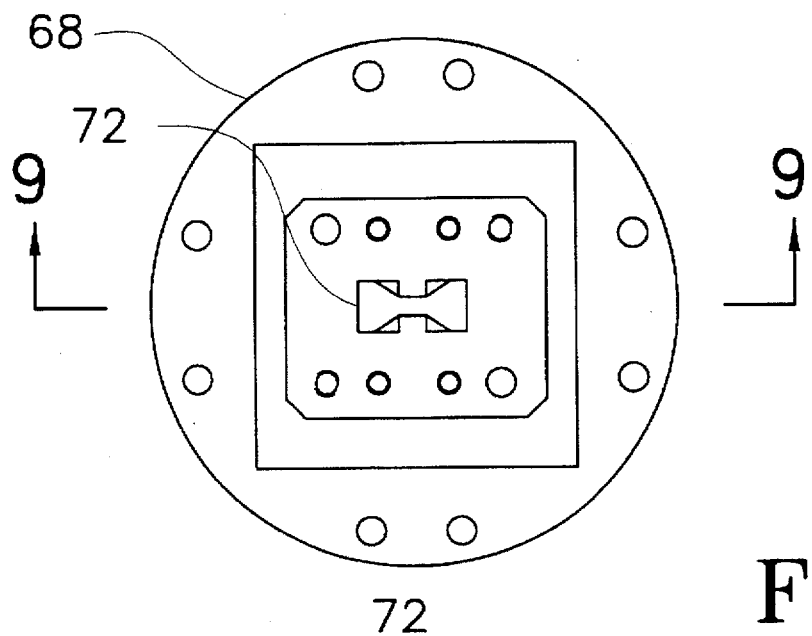
FIG. 7 is an elevational view of a tapered waveguide applicator of the present invention showing the inlet opening thereof.
Figure 9:
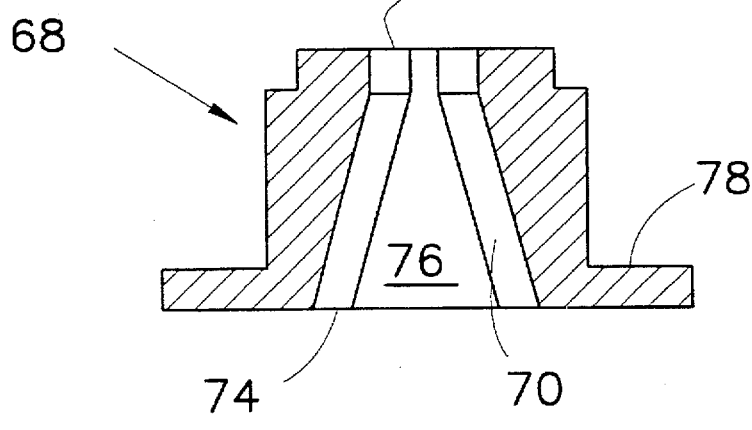
FIG. 9 is a bottom plan view, in section, of the tapered waveguide taken along 9—9 of FIG. 7.
Figure 8:
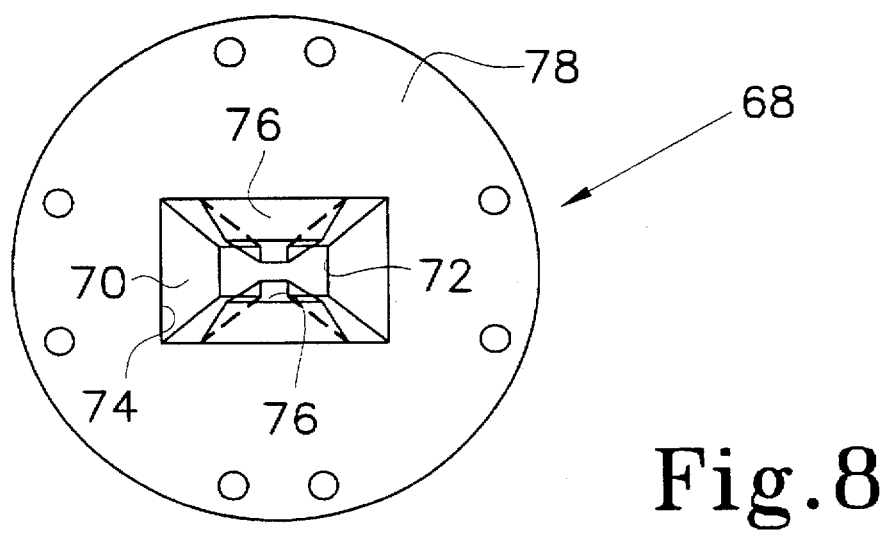
FIG. 8 is an end elevational view of the tapered waveguide applicator of FIG. 7 showing the outlet opening thereof.

Illustrated in FIGS. 7–9 is a tapered waveguide applicator 68. FIG. 7 is an end view showing the inlet opening 72. FIG. 8 illustrates and end view showing an outlet 74. FIG. 9 illustrates a cross-sectional view of the waveguide applicator 68, wherein the tapered inner wall 70 is more clearly detailed. This illustration of the waveguide applicator 68 is for exemplary purposes only. Therefore, it is not intended that the method 11 of the present application be limited to the use of the illustrated waveguide applicator 68.

The microwave source 12 described above includes a helix TWT amplifier. However, it will be understood that many other microwave sources 12 may be used in accordance with other aspects of the present invention. Table 3 below gives typical characteristics of some other suitable microwave sources 12.

TABLE 3

Characteristics of Some Suitable Microwave Sources:

| Source Type | Frequency Range (GHz) | Band-width (%) | Output Power (kW) Peak | Output Power (kW) Average | Overall Eff. (%) |
|---|---|---|---|---|---|
| Ring-loop TWT | .5–20 | 5–15 | 1–20 | .05–.6 | 30–45 |
| Ring-bar TWT | .5–20 | 10–20 | 3–30 | .08–.9 | 30–45 |
| Coupled-cavity TWT | .5–300 | 5–15 | 50–5000 | 1–300 | 40–60 |
| Klystron | .5–70 | 5–8 | 100–8000 | 1–5000 | 40–70 |
| Crossed-field Amp | .5–20 | 15–40 | 100–3000 | 1–300 | 30–50 |

Figure 10:
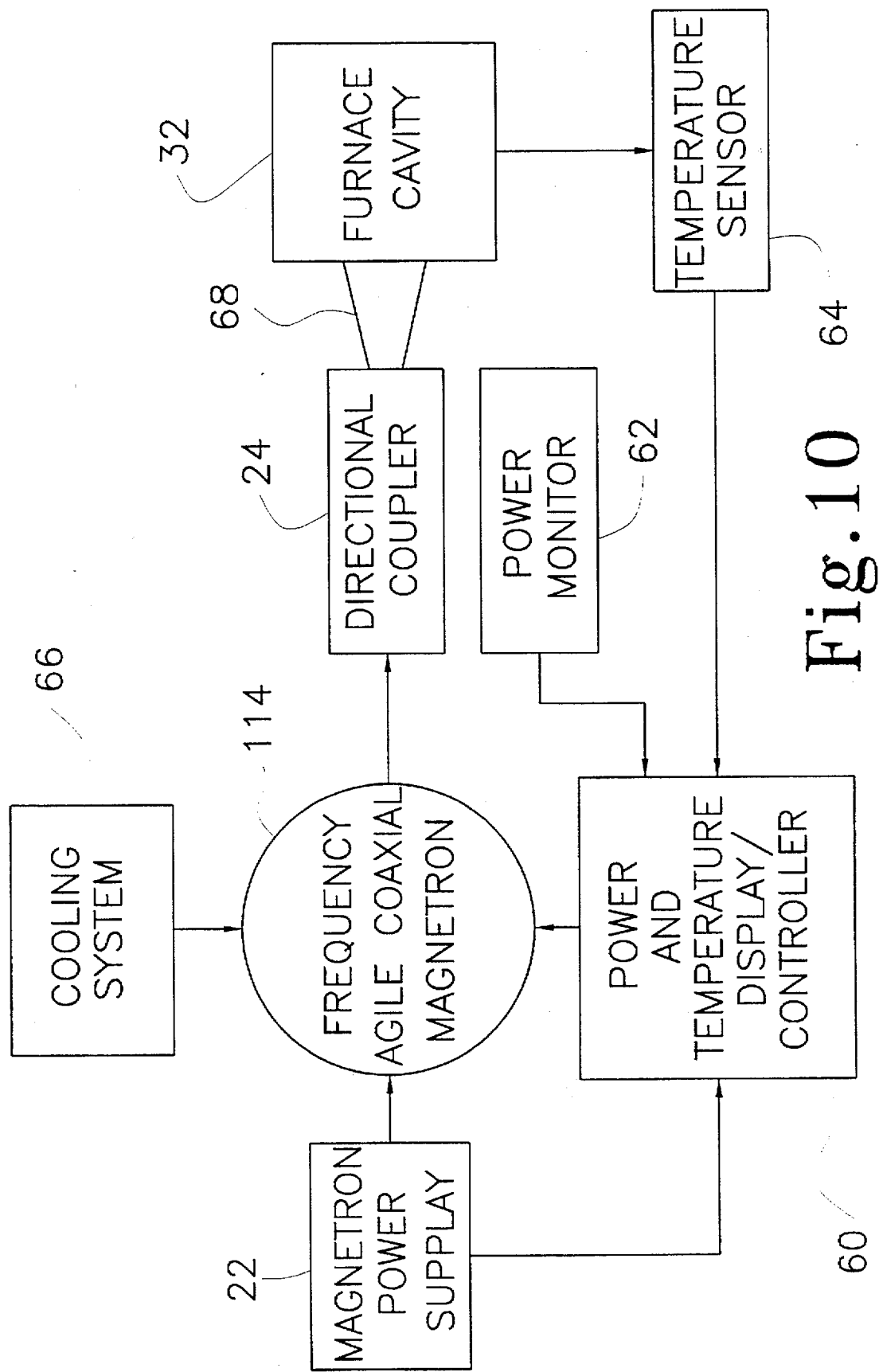
FIG. 10 illustrates a schematic diagram of another preferred embodiment of the variable frequency microwave heating apparatus of the present invention.

Illustrated in FIG. 10 is an alternate embodiment of the variable frequency microwave heating apparatus 10 of the present invention. In this alternate embodiment, a high-power oscillator 114 such as a frequency-agile coaxial magnetron is substituted for the microwave oscillator 14, the pre-amplifier power control 18 and the TWT 20 of the previously described embodiments. The magnetron 14 of the preferred embodiment has a usable bandwidth of at least 5% of its center frequency. The magnetron 114 is frequency-controlled either manually or, preferably, through a closed-loop, voltage-based feedback control system. In such a feedback control system, a low-level (0 to 10 V) signal is used to activate a servo-mechanism in the magnetron 114 which "tunes" the magnetron 114 from one frequency to another by precise repositioning of a plunger plate in the magnetron's coaxial cavity.

Figure 11:
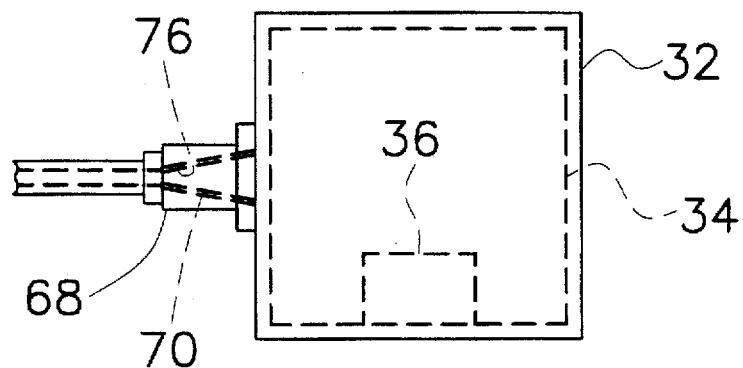
FIG. 11 is an elevational view of a general depiction of a microwave furnace and waveguide applicator constructed in accordance with several features of the present invention wherein a workpiece is shown being cured in a batch-wise manner.

FIG. 11 generally illustrates a batch-type process in which a workpiece 36 such as a polymer article is placed within a multi-mode cavity 34. Microwaves from a variable frequency microwave generator 12 are introduced into the multi-mode cavity 34 through a waveguide applicator 68. In addition to the components shown in FIG. 11, it will be appreciated by skilled artisans that the microwave cavity 34 may also contain molds, tooling, or other fixtures to support and/or constrain the workpiece 36. It will further be appreciated that a batch might comprise a single workpiece 36 or any number of similar workpieces 36 placed in the cavity simultaneously.

Figure 12:
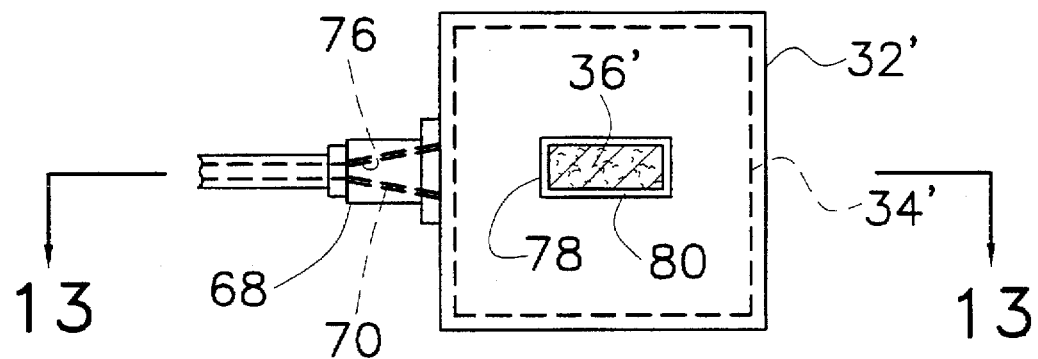
FIG. 12 is an elevational view of a general depiction of a microwave furnace and waveguide applicator constructed in accordance with several features of the present invention wherein a continuous workpiece is shown being cured while being fed through openings provided in the microwave furnace.
Figure 13:
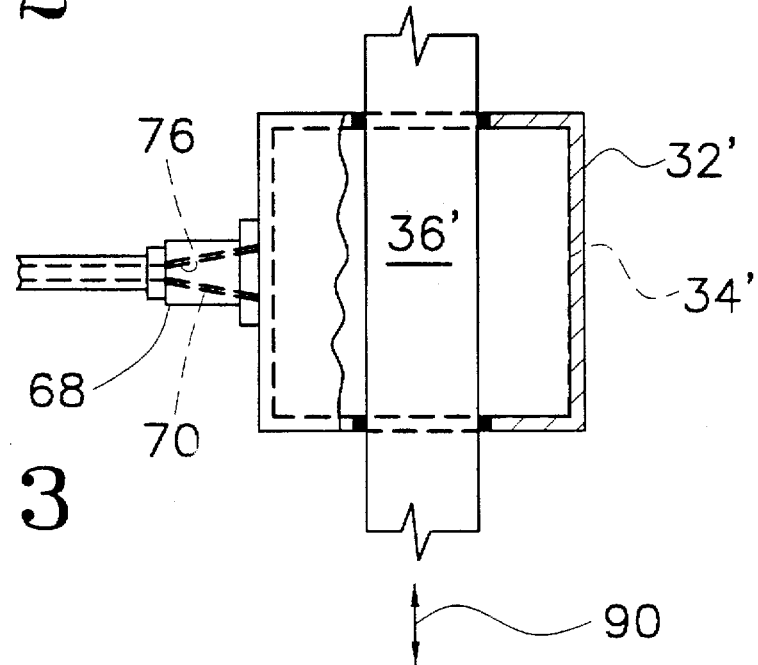
FIG. 13 is a top plan view, partially in section, of the microwave furnace, waveguide, and continuous workpiece of FIG. 12, taken along 13—13 thereof.

FIGS. 12 and 13 generally illustrate an alternate embodiment of the multi-mode microwave furnace 32' for use in conjunction with curing a workpiece 36' which is made in the form of a generally continuous film, sheet, or web. Many textiles, including fiberglass products, are given a polymer coating as one step in a production process. To accommodate continuous processing, the microwave furnace 32' defines openings 78 in opposing sides thereof to permit the workpiece 36' to pass therethrough, as indicated by the double-headed arrow 90. Depending upon the direction of travel of the workpiece 36', one of the openings 78 serves as an inlet and the other as an outlet for the passage of the workpiece 36'. The workpiece 36', in an uncured state, is passed through the opening 78 serving as an inlet, is cured within the microwave cavity 34', and is then passed through the other opening 78 serving as an outlet. Microwaves from the microwave signal generator 12 are introduced into the multi-mode cavity 34' through a waveguide 68. A sealing device 80 may be provided to minimize leakage of microwave radiation through the openings 78 and may include one or a combination of baffles, chokes, or any other conventional device.

Figure 14:
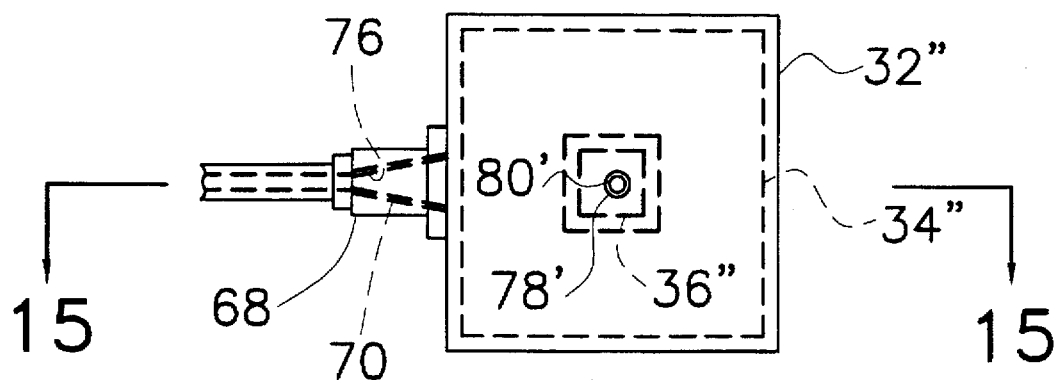
FIG. 14 is an elevational view of a general depiction of a microwave furnace and waveguide applicator constructed in accordance with several features of the present invention wherein a workpiece is shown being cured while being compressed.
Figure 15:
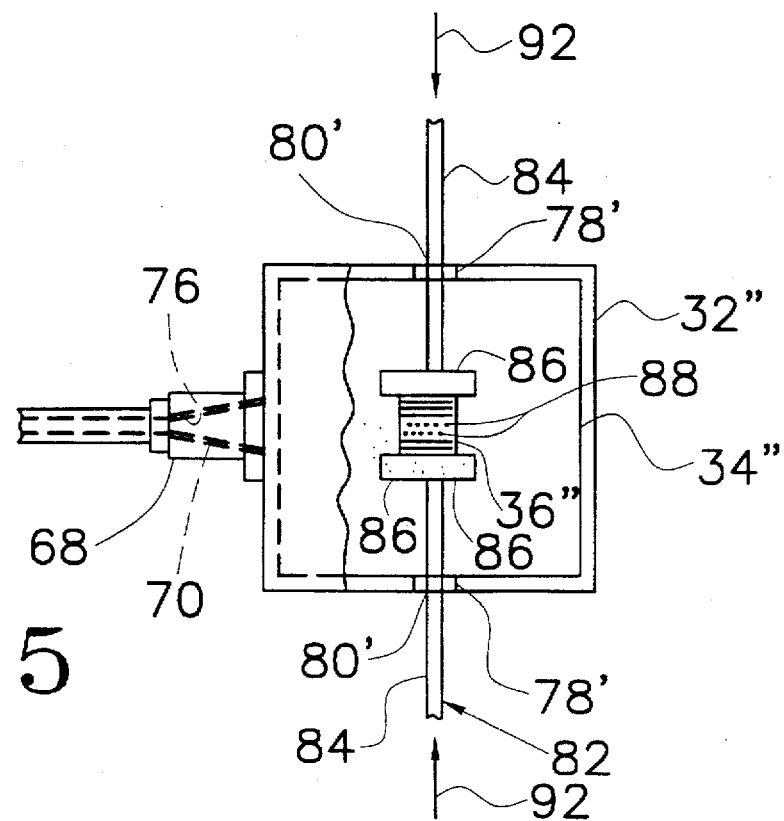
FIG. 15 is a top plan view, partially in section, of the microwave furnace, waveguide, workpiece, and compressor of FIG. 14, taken along 15—15 thereof.

FIGS. 14 and 15 illustrate another alternate embodiment of the multi-mode microwave furnace 32" used in the method 11 of the present invention for curing a workpiece 36" such as a fiber-reinforced polymer composite. Such workpieces 36" are often formed as an assembly, or "layup", of one or more plies of fiber tape or cloth that has been impregnated with a thermoplastic or thermosetting polymer, hence, the term "prepreg laminate". The curing of a prepreg laminate often includes a compressing device 82 for applying a compressive load to the workpiece 36" to insure adequate bonding and maintain density. The workpiece 36", containing reinforcing fibers 88, is placed within the multi-mode microwave cavity 34". A compressive load, as indicated by the arrows 92, is applied through pushrods 84 and platens 86. While the workpiece 36" is subjected to the compressive load, microwaves from a microwave signal generator 12 are introduced into the microwave cavity 34" through the waveguide 68.

The pushrods 84 and platens 86 are preferably constructed of microwave-transparent materials such as glass or ceramics. The workpiece 36" illustrated in FIG. 15 has several layers of fibers 88 oriented at right angles to each other. It will be appreciated that any number of plies can be used in the method of the present invention and that successive plies can be oriented at any desired angle with respect to preceding layers.

Although the term "polymer-matrix composite" is generally used only for polymer articles that contain reinforcing fibers 88, it is well known that in fact most polymer products contain various additives such as inorganic fillers (including, but not limited to, powdered metals, powdered metal carbides, and powdered metal oxides), pigments, and carbon black. Microwave processing of these "filled" polymers must take into account the presence of these additives and their possible influence on the absorption of microwave energy.

The efficiency of the variable frequency microwave heating apparatus 10 of the present invention has been displayed in various tests performed in the development process. Described below are several embodiments tested. However, it is not the intentions of the inventors to limit the present invention to such embodiments.

In the first tested embodiment, a 2.5 KW microwave furnace 32 suitable for sintering, heat treatment, and other high-temperature processes was constructed. A voltage-controlled oscillator 14, Model VCO 100-0243 manufactured by Delphi Components, provided a low-power microwave signal, continuously variable from 4 to 8 GHz by the application of a 0 to 15 V control signal. A solid state preamplifier 18 with a variable gain option, Model NHI 4080MW-2 manufactured by National Hybrid, Inc., provided variable amplification of the signal from the voltage-controlled oscillator 14.

A high-power microwave amplifier 20 included a traveling wave tube, Model T-1096 manufactured by Microwave Laboratories, Inc. (see Table 1), and a high-voltage DC power supply, Model BRE-15-140-ML manufactured by Universal Voltronics (see Table 2). The high-power microwave amplifier amplified the signal for a gain of approximately +37 db. The resulting microwave power was continuously selectable over a frequency range of 4 to 8 GHz and a power range of 0 to 2.5 KW. The frequency and amplitude could be individually modulated into any waveform within these parameters.

A dual directional coupler 24, Model R202-5N manufactured by Microwave Engineering Corporation, was provided, through which the microwave power is applied. The microwave power was input to a multi-mode cavity 34 approximately 12 inches in diameter and approximately 9 inches long such that a wide variety of random microwave modes were excited within the cavity 34. Forward and reflected power levels were continuously measured with two power meters, Model HP436A manufactured by Hewlett Packard.

Efficient microwave heating was demonstrated for both silicon carbide and boron carbide ceramic bodies. In each case the frequency could be adjusted to minimize reflected power for the actual load in the cavity 34, and the ceramic heated rapidly. There was no need to adjust the dimensions of the cavity 34 or to excite any particular mode in order to heat with maximum efficiency.

In the second tested embodiment, a 300 W microwave furnace suitable at least for plasma processing, sterilization and food processing studies was constructed using the multi-mode cavity 34 from a conventional microwave oven and an air-cooled traveling wave tube with a bandwidth of 2 to 8 GHz.

Experiments with a wide variety of samples including water, popcorn, and alumina ceramics doped with Co, Cr, or V oxides demonstrated highly efficient heating when the microwave frequency was adjusted to minimize reflected power. Results showed that when the frequency was continuously swept across the operating bandwidth, reflected power was extremely low and the sample heated efficiently regardless of its location within the cavity 34.

One such test of the variable frequency microwave heating apparatus 10 included the curing of a sample of epoxy resin, namely, ERL-2258 resin manufactured by Union Carbide and M-phenylenediamine hardener manufactured by DuPont. Samples were mixed according to manufacturers' directions and poured into 4-inch diameter glass dishes. One sample was heated at a fixed frequency of 6 GHz whereas the other was heated in accordance with the method 11 of the present invention by sweeping the frequency from 4.5 to 7.5 GHz, 5000 times per second. The fixed-frequency sample suffered from non-uniform heating and ultimately catastrophic thermal runaway. The swept-frequency sample cured uniformly with no evidence of localized overheating, thereby demonstrating the value of frequency sweeping to create a more uniform power distribution within the microwave cavity 34.

The helix TWT in the above embodiment is liquid cooled, and therefore requires additional power and support equipment. For bench-scale experimentation, air-cooled variable frequency microwave heating apparatuses 10 were built using Microwave Laboratories, Inc. air-cooled helix TWT's (e.g., model T-1067) and the tapered waveguide applicator 68 used in accordance with the method 11 of the present invention. A 13×13×10 inch rectangular microwave cavity 34 was used, in which microwave power was coupled efficiently over the frequency range from 2.5 to 7.5 GHz. It will be recognized that this range covers almost two octaves. Tests using thermally sensitive paper demonstrated that frequency sweeping was highly effective at creating a uniform power density throughout the cavity 34.

The microwave cavity 34 of this embodiment was subjected to similar tests described above to cure a sample of epoxy resin [ERL-2258 resin from Union Carbide and M-phenylenediamine hardener from DuPont]. In these tests, both the frequency range and the sweep rate were reduced in order to determine the minimal range necessary for adequate mode stirring. At the same time, the sample size was increased to a 6 inch diameter disk. From these results, it was evident that even a 20% bandwidth would be sufficient to produce uniform microwave heating in some samples, and particularly those in which high thermal conductivity assists in bringing minor spatial variations into equilibrium.

It will be appreciated by those skilled in the art that the actual bandwidth required to achieve uniform curing is dependant on various factors, including the size and shape of the microwave cavity and the average microwave frequency used. For example, a 12×12×10 inch rectangular cavity will support over 600 possible closely-spaced resonant modes over the frequency range from 4 to 6 GHz. Thus, a bandwidth of as little as 5% of the center frequency could in some cases provide sufficient mode plurality to achieve relatively uniform curing results.

The microwave signal generators 12 used in the latter two test employ a helix TWT amplifier. However, as discussed previously, many other microwave sources may be used in accordance with other aspects of the present invention. Reference is made to Table 3 above which discloses typical characteristics of some other suitable microwave sources.

As discussed previously, the microwave heating apparatus 10 of the present invention may be equipped with more than one microwave source 12. To this extent, the latter-described microwave heating apparatuses 10 were further modified by adding a second TWT (Microwave Laboratories, Inc. model T-1068) and a second tapered microwave applicator 68, thereby giving the furnace 32 a useful bandwidth from approximately 2.5 to 17.5 GHz, or nearly three octaves. It will be understood that the foregoing example should not be interpreted as limiting the microwave heating apparatus 10 of the present invention to two microwave sources 12. Rather, it will be understood that any number of microwave sources 12 and waveguide applicators 68 can be combined with a single microwave cavity 34 in accordance with the present invention.

To better determine the limiting factor on required bandwidth, a theoretical model of a 12×12×10 inch rectangular microwave cavity 34 was constructed and used to determine the number of resonant modes capable of being supported in the cavity 34 over the 4 to 6 GHz frequency range. The results of these calculations clearly demonstrate that, even in a cavity 34 this small, there are an enormous number (over 600) of possible, closely-spaced modes (often 3 to 4 at a single frequency) over even the 4 to 6 GHz frequency range. These results have been graphically illustrated in FIG. 19 as mode density versus frequency. From these results, it is clear that a bandwidth of as little as 5% of the center frequency could, in some cases, provide sufficient mode plurality to provide relatively uniform energy distribution in the microwave cavity 34.

Many uses of polymers do not involve a monolithic polymer article per se but rather a polymer coating upon a selected substrate. One important application of the method 11 of the present invention is in the curing of polymer coatings on wood products such as furniture, where microwave processing can enhance the usefulness of solvent-free paint or varnish systems. It will be appreciated by those skilled in the art that the present method 11 of frequency sweeping will enhance the uniformity of curing of coating systems on large objects such as furniture and the like.

It will be further appreciated that the method 11 of the present invention may be applied to any number of thermosetting or thermoplastic materials including, but not limited to, phenolics, amines, epoxies, silicones, urethanes, polysulfides, and natural and synthetic rubbers. It will also be understood that the term "curing" must be read in its broadest sense to include condensation polymerization, addition polymerization, cross-linking, vulcanization, and drying. All of the foregoing examples of "curing" processes include thermally activated steps. The term "drying" may include the removal of solvents (either polar or non-polar) as well as the removal of water formed during condensation reactions such as in the formation of polyesters. Furthermore, the desired degree of curing might in some situations be less than complete, if further processing operations are planned, for example. The foregoing examples are thus intended for illustration only and should not be interpreted as limiting the method of the present invention as described in the attached claims.

While several preferred embodiments have been shown and described in accordance with the method of the present invention, and several embodiments which have been constructed and tested have been specifically delineated, it will be understood that such descriptions are not intended to limit the disclosure, but rather it is intended to cover all modifications and alternate methods falling within the spirit and the scope of the invention as defined in the appended claims or their equivalents.

Having thus described the aforementioned invention, we claim:

1. A method for curing a polymeric material comprising the steps of:
   a. placing said polymeric material in a variable frequency heating apparatus including a microwave furnace including a multi-mode cavity; and
   b. irradiating said polymeric material with microwaves of varying frequencies, said varying frequencies defining a bandwidth of at least five percent above and below a center frequency of said variable frequency heating apparatus, whereby a time-averaged power density within said multi-mode cavity is substantially uniform.

2. The method of claim 1 wherein said step of irradiating said polymeric material with microwaves of varying frequencies is performed within said variable frequency microwave heating apparatus, said variable frequency microwave heating apparatus comprising:
   a microwave signal generator for generating a signal with a selected waveform, frequency, and amplitude;
   a first signal amplifier for amplifying said signal generated by said signal generator, said first signal amplifier producing microwaves within a selected frequency range and defining a center frequency, said microwaves having an associated power with a selected magnitude, said first signal amplifier comprising a microwave electron device having a useful bandwidth of at least five percent of said center frequency;
   a power supply for supplying power to said first signal amplifier; and
   a transmitter for conveying said microwaves produced by said first signal amplifier into said microwave furnace.

3. The method of claim 1 wherein said step of irradiating said polymeric material with microwaves of varying frequencies is performed within said variable frequency microwave heating apparatus, said variable frequency microwave heating apparatus comprising:
   a microwave signal generator for generating a signal with a selected waveform, frequency, and amplitude, said microwave signal generator being a frequency-agile coaxial magnetron, said coaxial magnetron having a useful bandwidth of at least five percent of a center frequency thereof;
   a power supply for supplying power to said microwave signal generator; and
   a transmitter for conveying said microwaves produced by said microwave signal generator into said multi-mode cavity.

4. The method of claim 1 wherein said polymeric material defines a continuous sheet and said microwave furnace includes an inlet and an outlet, said inlet for receiving said polymeric material in an uncured state, said outlet for removal of said polymeric material in a cured state.

5. The method of claim 1 wherein said polymeric material is impregnated with reinforcing fibers.

6. The method of claim 5, after said step of placing said polymeric material in a variable frequency heating apparatus and simultaneously with said step of irradiating said polymeric material, further comprising the step of applying a compressive force to said polymeric material.

7. The method of claim 1 wherein said polymeric material is a thermosetting resin.

8. The method of claim 7 wherein said thermosetting resin is selected from the group consisting of phenolics, amines, epoxies, silicones, and polysulfides.

9. The method of claim 1 further comprising the step of removing at least one volatile species from said polymeric material.

10. The method of claim 9 wherein said volatile species is water.

11. The method of claim 1 wherein said polymeric material comprises a coating disposed upon a selected substrate.

12. The method of claim 1 wherein said polymeric material further contains at least one additive to increase absorption of microwave energy in said polymeric material.

13. The method of claim 12 wherein said at least one additive is selected from the group consisting of carbon black, powdered metals, powdered metal carbides, and powdered metal oxides.

* * * * *